US008677044B1

(12) United States Patent
Gandhi et al.

(10) Patent No.: US 8,677,044 B1
(45) Date of Patent: Mar. 18, 2014

(54) METHOD AND SYSTEM FOR COMMUNICATION USING MULTIPLE DMA CHANNELS

(71) Applicant: QLOGIC, Corporation, Aliso Viejo, CA (US)

(72) Inventors: Rajendra R. Gandhi, Laguna Niguel, CA (US); Kathy K. Caballero, Huntington Beach, CA (US); Kuangfu David Chu, Irvine, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 0 days.

(21) Appl. No.: 13/660,928

(22) Filed: Oct. 25, 2012

(51) Int. Cl.
*G06F 13/28* (2006.01)
*G06F 13/00* (2006.01)

(52) U.S. Cl.
USPC .............................................. 710/308; 710/22

(58) Field of Classification Search
USPC ...................................... 710/305–308, 22–28
See application file for complete search history.

(56) References Cited

U.S. PATENT DOCUMENTS

| 5,388,217 | A | * | 2/1995 | Benzschawel et al. | 710/36 |
|---|---|---|---|---|---|
| 5,826,106 | A | * | 10/1998 | Pang | 710/25 |
| 5,935,220 | A | * | 8/1999 | Lumpkin et al. | 710/5 |
| 6,199,121 | B1 | * | 3/2001 | Olson et al. | 710/24 |
| 6,564,271 | B2 | * | 5/2003 | Micalizzi et al. | 710/39 |
| 7,415,550 | B2 | * | 8/2008 | Tanaka et al. | 710/26 |
| 7,577,772 | B2 | * | 8/2009 | Sonksen et al. | 710/22 |
| 7,904,614 | B1 | * | 3/2011 | Marshall et al. | 710/22 |
| 2003/0126322 | A1 | * | 7/2003 | Micalizzi et al. | 710/52 |
| 2004/0028053 | A1 | * | 2/2004 | Mes | 370/395.7 |
| 2005/0223136 | A1 | * | 10/2005 | Tanaka et al. | 710/22 |
| 2006/0026307 | A1 | * | 2/2006 | Bragagnini et al. | 710/22 |
| 2006/0112199 | A1 | * | 5/2006 | Sonksen et al. | 710/22 |
| 2008/0126600 | A1 | * | 5/2008 | Mitchell et al. | 710/22 |
| 2009/0150575 | A1 | * | 6/2009 | Madruga et al. | 710/25 |
| 2009/0150576 | A1 | * | 6/2009 | Madruga et al. | 710/28 |
| 2011/0131347 | A1 | * | 6/2011 | Marshall et al. | 710/22 |

* cited by examiner

*Primary Examiner* — Christopher Shin
(74) *Attorney, Agent, or Firm* — Klein, O'Neill & Singh, LLP (57) ABSTRACT

Method and system for sending data from a memory of a computing system interfacing with a device is provided. An input/output control block (IOCB) from the computing system for transferring the data from the memory of the computing system is received by the device. The device then allocates a plurality of DMA channels to the IOCB for transferring the data from the memory of the computing system when a number of pending input/output (I/O) requests when the IOCB is received is less than a number of available direct memory access (DMA) channels to receive the data from the memory of the computing system.

20 Claims, 5 Drawing Sheets

METHOD AND SYSTEM FOR COMMUNICATION USING MULTIPLE DMA CHANNELS

TECHNICAL FIELD

The present invention relates to computing systems.

BACKGROUND

Computing systems are commonly used today. A computing system often communicates with a peripheral device for performing certain functions, for example, reading and writing information. Continuous efforts are being made to improve communication between computing systems and peripheral devices.

SUMMARY

The various present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one embodiment, a machine implemented method for sending data from a memory of a computing system interfacing with a device is provided. The method includes receiving an input/output control block (IOCB) from the computing system for transferring the data from the memory of the computing system to the device; allocating a plurality of DMA channels to the IOCB for transferring the data from the memory of the computing system when a number of pending input/output (I/O) requests when the IOCB is received is less than a number of available direct memory access (DMA) channels to receive the data from the memory of the computing system; receiving portions of the data from the memory of the computing system and saving the portions of data at one or more memory storage locations at the device; tracking an order in which the portions of data for the IOCB are received compared to any other pending request; and transmitting the data to another device via a link.

In another embodiment, a system is provided. The system includes a computing system having a memory and a processor; and a device interfacing with the computing system for receiving data from the memory of the computing system to a memory device of the device. The device is configured to receive an input/output control block (IOCB) from the computing system for transferring the data from the memory of the computing system to the device; allocates a plurality of DMA channels to the IOCB for transferring the data from the memory of the computing system, when a number of pending input/output (I/O) requests when the IOCB is received is less than a number of available direct memory access (DMA) channels to receive the data from the memory of the computing system; receives portions of the data from the memory of the computing system and saves the portions of data at one or more memory storage locations at the device; tracks an order in which the portions of data are received for the IOCB compared to any other pending request; and transmits the data to another device via a link.

In yet another embodiment, a device having an interface for communicating with a computing system having a memory and a processor; a plurality of direct memory access (DMA) channels managed by a DMA module for transferring data from the memory of the computing system; and a memory device for receiving data from the memory of the computing system is provided. The device is configured to receive an input/output control block (IOCB) from the computing system for transferring the data from the memory of the computing system to the device; allocates more than one DMA channel to the IOCB for transferring the data from the memory of the computing system, when a number of pending input/output (I/O) requests when the IOCB is received is less than a number of available DMA channels to receive the data from the memory of the computing system; receives portions of the data from the memory of the computing system and saves the portions of data at one or more memory storage locations at the device; tracks an order in which the portions of data for the IOCB are received compared to any other pending request; and transmits the data to another device via a link.

This brief summary has been provided so that the nature of the disclosure may be understood quickly. A more complete understanding of the disclosure can be obtained by reference to the following detailed description of the embodiments thereof concerning the attached drawings.

BRIEF DESCRIPTION OF THE DRAWINGS

The various embodiments relating to facilitating communication between devices in a network now will be discussed in detail with an emphasis on highlighting the advantageous features. These novel and non-obvious embodiments are shown in the accompanying drawings, which are for illustrative purposes only. These drawings include the following figures, in which like numerals indicate like parts.

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.).

The embodiments disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

Figure 1A:
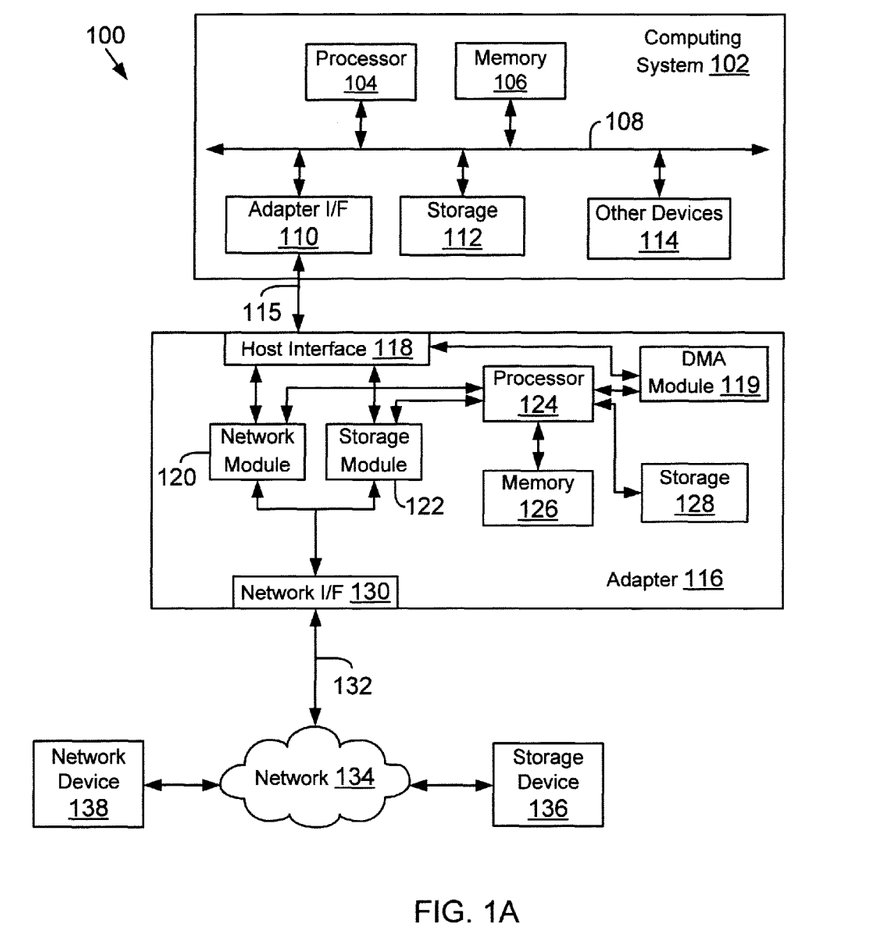
FIG. 1A is a functional block diagram of a computing system coupled to a network through an adapter.

FIG. 1A is a block diagram of a system 100 configured for use with the present embodiments. The system 100 may include one or more computing system 102 (may also be referred to as "host system 102") coupled to another device via a link 115, for example, an adapter 116 that interfaces with a network 134. The network 134 may include, for example, additional computing systems, servers, storage systems, etc. It is noteworthy that although the description below is based on the interaction between adapter 116 and host system 102, the embodiments disclosed herein are not limited to any particular adapter type or device type.

The computing system 102 may include one or more processors 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The processor 104 executes computer-executable process steps and interfaces with an interconnect (or computer bus) 108. The computer bus 108 may be, for example, a system bus, a Peripheral Component Interconnect (PCI) bus (or PCI-Express (PCIe) bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other interconnect type.

An adapter interface 110 interfaces with the adapter 116 via the link 115 for sending and receiving information. Link 115 may be an interconnect system, for example, a PCIe bus. The computing system 102 also includes other devices and interfaces 114, which may include a display device interface, a keyboard interface, a pointing device interface, etc. Details regarding the other devices 114 are not germane to the embodiments disclosed herein.

The computing system 102 may further include a storage device 112, which may be for example a hard disk, a CD-ROM, a non-volatile memory device (flash or memory stick) or any other mass storage device. Storage 112 may store operating system program files, application program files, and other files. Some of these files are stored on storage 112 using an installation program. For example, the processor 104 may execute computer-executable process steps of an installation program so that the processor 104 can properly execute the application program.

Memory 106 also interfaces to the computer bus 108 to provide the processor 104 with access to memory storage. Memory 106 may include random access main memory (RAM). When executing stored computer-executable process steps from storage 112, the processor 104 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1A, link 115 and the adapter interface 110 couple the adapter 116 to the computing system 102. The adapter 116 may be configured to handle both network and storage traffic. Various network and storage protocols may be used to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 Gbps. The descriptions of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage protocol used to access storage systems is Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port.

A new and upcoming standard, called Fibre Channel over Ethernet (FCOE) has been developed to handle both Ethernet and Fibre Channel traffic in a storage area network (SAN). This functionality would allow Fibre Channel to leverage 10 Gigabit Ethernet networks while preserving the Fibre Channel protocol. The adapter 116 shown in FIG. 1A may be configured to operate as an FCOE adapter and may be referred to as FCOE adapter 116. QLogic Corporation, the assignee of the present application, provides one such adapter. The illustrated adapter 116, however, does not limit the scope of the present embodiments. The present embodiments may be practiced with adapters having different configurations.

Referring back to FIG. 1A, adapter 116 interfaces with the computing system 102 via the link 115 and a host interface 118. In one embodiment, the host interface 118 may be a PCI Express interface having logic/circuitry for sending and receiving PCI-Express packets described below in detail.

The adapter 116 may also include a processor (or more than one processor) 124 that executes firmware instructions out of a memory 126 to control overall adapter operations. The adapter 116 may also include storage 128, which may be for example non-volatile memory, such as flash memory, or any other device. The storage 128 may store executable instructions and operating parameters that can be used for controlling adapter operations.

The adapter 116 includes a network module 120 for handling network traffic via a link 132. In one embodiment, the network module 120 includes logic and circuitry for handling network packets, for example, Ethernet or any other type of network packets. The network module 120 may include memory buffers (not shown) to temporarily store information received from other network devices 138 and transmitted to other network devices 138.

The adapter 116 may also include a storage module 122 for handling storage traffic to and from storage devices 136. The storage module 122 may further include memory buffers (not shown) to temporarily store information received from the storage devices 136 and transmitted by the adapter 116 to the storage devices 136. In one embodiment, the storage module 122 is configured to process storage traffic according to the Fibre Channel storage protocol, or any other protocol. It is noteworthy that adapter 116 may only have a network module 120 or a storage module 122. The embodiments described herein are not limited to any particular adapter type.

The adapter 116 also includes a network interface 130 that interfaces with link 132 via one or more ports (not shown). The network interface 130 includes logic and circuitry to receive information via the network link 132 and pass it to either the network module 120 or the storage module 122, depending on the packet type.

Adapter 116 also includes a direct memory access (DMA) module 119 that is used to manage access to link 115. The DMA module 119 uses a plurality of DMA channels (168A-168N, FIGS. 1C/1D) for transferring data via link 115. The DMA channels are typically used to move control structures such as input/output control blocks (IOCBs), input/output status blocks (IOSBs) and data between host system memory 106 and the adapter memory 126.

Figure 1B:
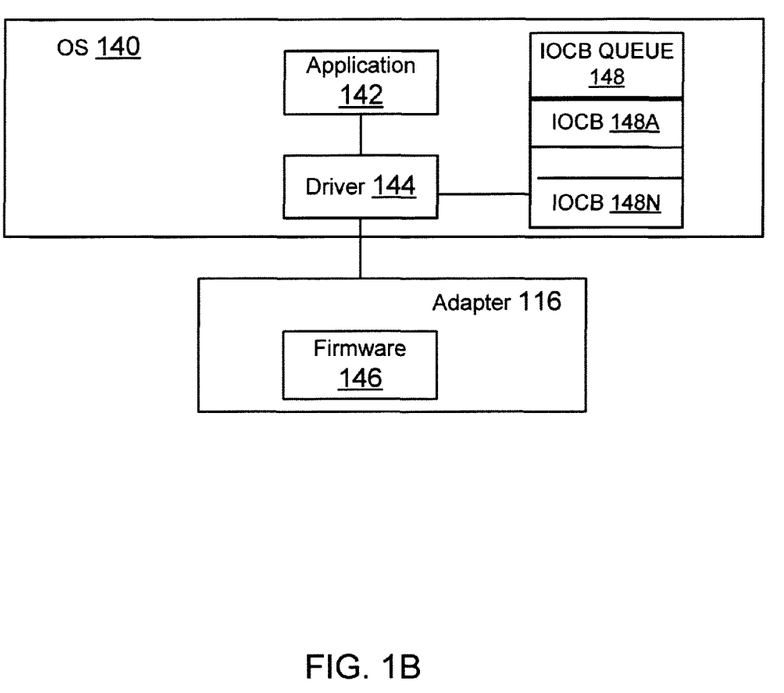
FIG. 1B shows a block diagram of a generic architecture used by the system of FIG. 1A.

FIG. 1B shows an example of a generic software architecture used by system 100. Processor 104 executes an operating system 140 for controlling the overall operations of computing system 102. The operating system may be Windows based, Linux operating system, Solaris, or any other operating system type. The embodiments disclosed herein are not limited to any particular operating system type.

An application 142 may be executed by processor 104 for performing certain functions. For example, application 142 may be an email program, a database application or any other application type. Application 142 may send a command to a driver 144 for performing an operation, for example, reading and/or writing data (input/output (I/0)) at another storage device. The driver 144 processes the request and communicates with firmware 146 executed by processor 124 of adapter 116. A component of adapter 116 then processes the request.

Typically for managing data transfers across link 115, the following process steps are typically used: an IOCB is first generated by the driver 144 and saved at an IOCB queue 148, shown as 148A-148N. The IOCB queue 148 may be at host memory 106 or any other location. The IOCB is obtained by adapter 116 which may be to provide data to host processor 104 or to send data provided by host processor 104. For a write operation, an IOCB typically includes an "address" of host memory 106 where data that needs to be sent is stored and a "length" that indicates the amount of data that needs to be transferred. Both IOCB fetch and data transfer operations are performed using DMA operations via the DMA channels. Based on the IOCB, adapter 116 executes the operations that may be needed.

Figure 1C:
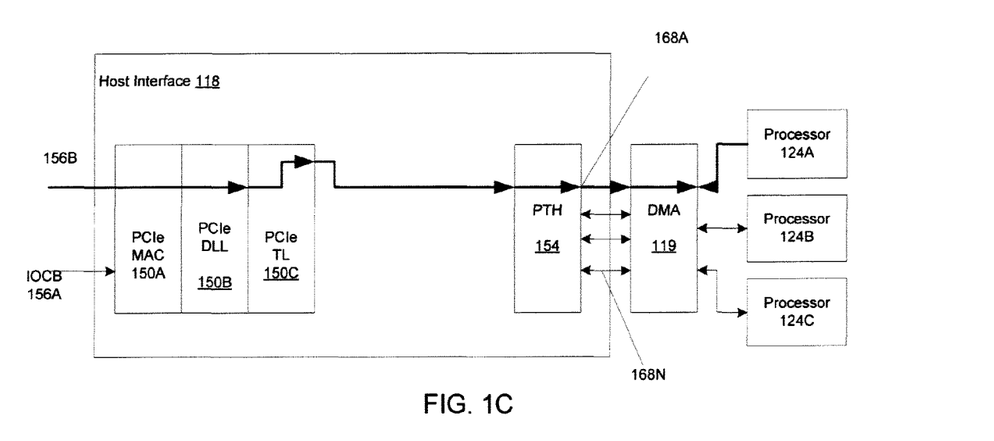
FIG. 1C shows an example of a system used for communication, according to one embodiment.
Figure 1D:
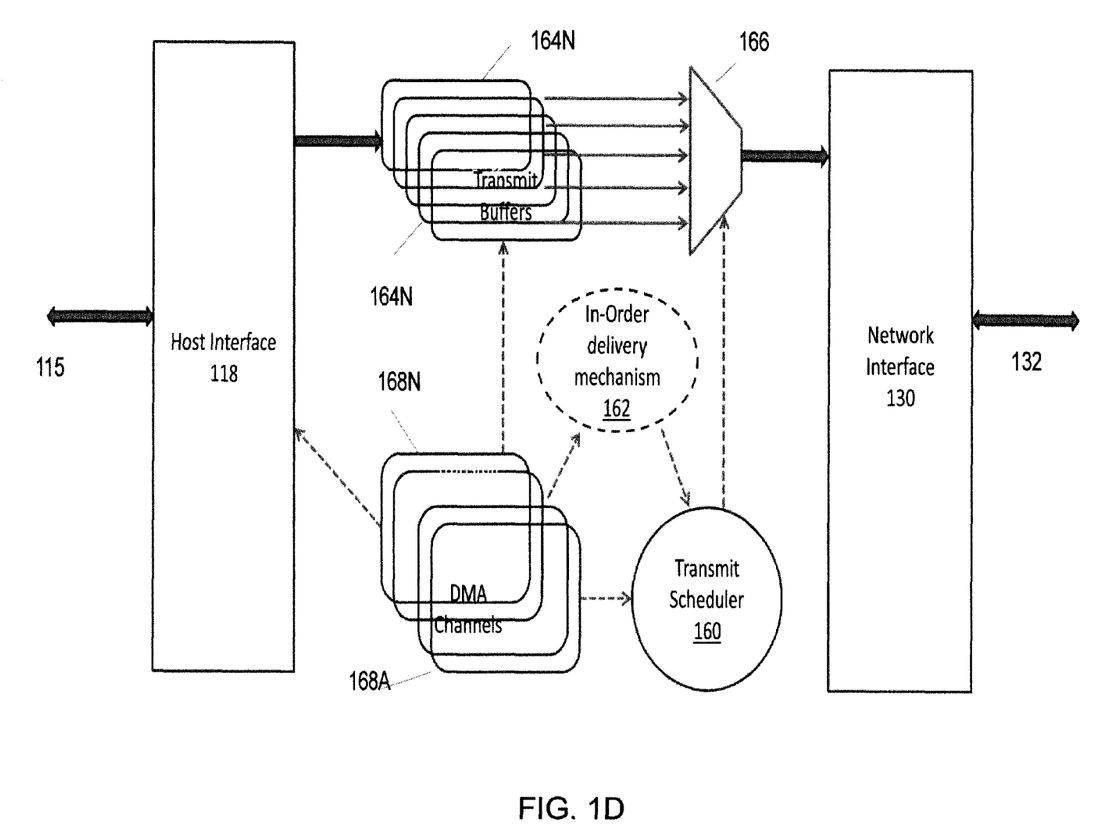
FIG. 1D shows an example of a system for efficiently processing I/O requests, according to one embodiment.

Adapter 116 then uses DMA operation to send a status block (IOSB) to processor 104 indicating the completion of IOCB execution and associated data transfer. The adapter 116 then sends an interrupt message to the host processor 104 to indicate completion of IOCB execution and posting of the IOSB status in the host system memory 106 so that it can process IOSBs and notify application 142 of the completion of the data transfer process FIG. 1C shows a system for obtaining data as PCIe packets from host memory 106 via host interface 118, according to one embodiment. Host interface 118 having a plurality of modules is configured to process PCIe packets. Host interface 118 may include a PCIe media access control (MAC) layer (also referred to as PHY or PHY layer) 150A for receiving and sending messages via link 115. Host interface 118 includes a PCIe data link layer (referred to as DLL) 150B between a PCIe transaction layer (referred to as TL) 150C and PHY 150A. PHY 150A, DLL 150B and TL 150C are defined by the PCIe specification.

Host interface 118 also includes a PCI-Express Transaction Handler (PTH) 154 that interfaces with the DMA module 119 and TL 150C to send and receive information via link 115. PTH 154 performs various functions including error checking and others.

PCI-Express uses a packet-based protocol to exchange information between TL 150A and a TL (not shown) at the adapter interface 110. Transactions are carried out using requests and completions. Completions are used only when required, for example, to return read data or to acknowledge completion of a request. On the transmit side (i.e. packets to processor 104 from adapter 116), packets flow from the TL 150C to PHY 150A. On the receive side (i.e. packets to adapter 116 from processor 104), packets are processed by the PHY layer 150A and sent to TL 150C for processing. TL 150 C assembles and disassembles Transaction Layer Packets ("TLPs"). TLPs are used to communicate transactions, such as read and write and other type of events.

The system of FIG. 1C shows more than one processor 124 (labeled as 124A-124C) for adapter 116. The embodiments described herein are not limited to any particular number of processors. Processors 124A-124C interface with the DMA module 119 to send and receive data and messages via link 115.

As described above, driver 144 generates an IOCB for an I/O request to send data via network link 132 to a destination. The IOCB is placed at the IOCB queue 148. The IOCB (for example, 156A) is then received by adapter 116 and provided to one of the processors, for example, 124A. The processor 124A then programs a DMA channel (for example, 168A) to obtain data from host memory 106 via path 156B. Once data is received it is transmitted via network link 132 to its destination.

In conventional systems, one DMA channel is dedicated to each I/O request. For example, when IOCB 156A is received and all DMA channels 168A-168N are available then one of the DMA channels is dedicated for receiving data for IOCB 156A. One reason for dedicating a DMA channel is to maintain an order for receiving data from host memory 106 and to maintain in-order delivery of data that is transmitted via network link 132.

Conventional systems under utilize the DMA channels by dedicating individual DMA channels to a particular I/O request. The system of FIG. 1D provides a solution for utilizing DMA channels efficiently, where a data transfer task of a particular IO request is distributed over multiple DMA channels, improving the transfer rate at which data can be obtained from host memory 106 via link 115 and transmitted out via network link 132

FIG. 1D shows the plurality of DMA channels 168A-168N available to DMA module 119. Each DMA channel is uniquely identified by a DMA channel number. One or more of DMA channels are used to distribute data transfer task of an IO request. Since multiple data transfer requests for a single IO can result in data being received from host memory in any order, an "In-Order Delivery" mechanism 162 (also referred to herein as logic 162) is used to maintain the order in which data is transmitted via network link 132.

Logic 162 (shown as in-order delivery mechanism) maintains a data structure for tracking DMA channel numbers for DMA channels 168A-168N, memory storage locations (i.e. slot locations) at the transmit buffers 164A-164N allocated for a current data transfer request and the order in which requests are received from different DMA channels. When data is received from host memory 106, the data is placed at one of the allocated transmit buffers 164A-164N. Logic 162 is aware of the DMA request for which the data has been received at any given time. Logic 162 provides this information to a transmit scheduler 160 that controls via logic (a multiplexor) 166 the order in which data is read out from the transmit buffers 164A-164N. Logic 162 and scheduler 160 ensure that the data for the host memory request that is initiated at time T0 is transmitted on network link 132 before the data for the request that is initiated at time T1 (i.e. after T0), even if the host memory returned data for request initiated at T1 before data for request initiated at T0. Details of using a plurality of DMA channels for processing an I/O request are provided below with respect to FIG. 2.

Figure 2:
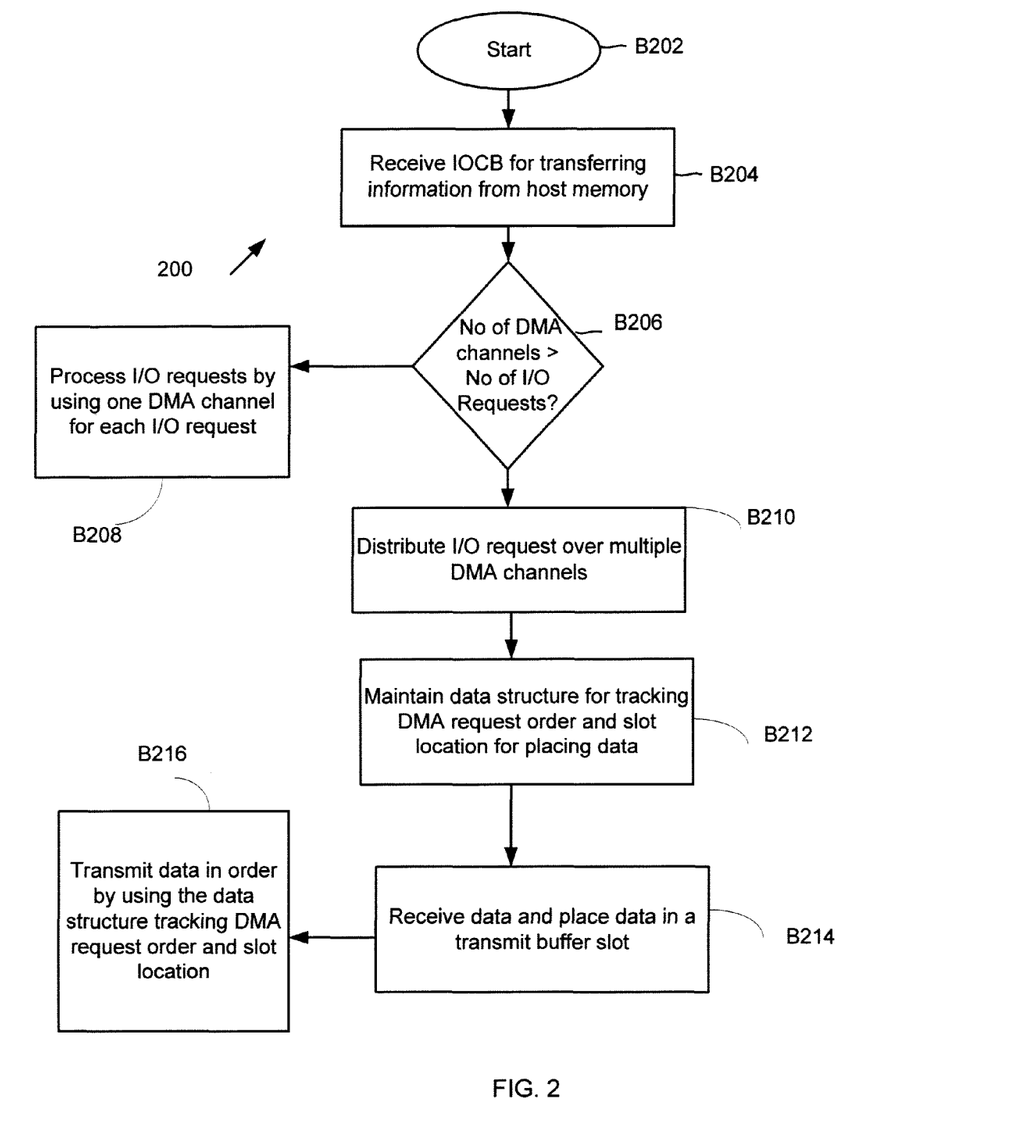
FIG. 2 shows a process for using the system of FIG. 1D, according to one embodiment.

FIG. 2 shows a process 200 for allocating more than one DMA channel for receiving data from host memory 106 via link 115, according to one embodiment. The process begins in block B202.

In block B204, an IOCB (156A) is received for transferring information from host memory 106. The IOCB includes a descriptor that provides an address of host memory 106 where data is located and the length of the transfer. The IOCB is provided to one of the processors 124 of adapter 116.

In block B206, the processor determines if the number of available DMA channels 168A-168N are greater than the number of IOCBs or I/O requests that are being processed. If the number of DMA channels is equal or fewer than the number of I/O requests, then in block B208, the IOCB is processed by using a dedicated DMA channel for each request. However, if the number of available DMA channels is greater than the number of IOCBs that are being processed, then in block B210, the data transfer for the IOCB is distributed among a plurality of DMA channels. The number of DMA channels that are made available for the IOCB would depend on the total length of the data transfer and the number of other IOCBs that may be pending.

In block B212, a data structure for the distributed IOCB is maintained by logic 162. The data structure is intended to track the DMA channel number that identifies the DMA channel, a DMA request order (i.e. the order in which DMA channel requests were received), the transmit buffer location that is used for storing data for each DMA request and a transmit buffer slot full/empty condition The slot/full and empty condition indicates is a slot has data or if it is empty.

In block B214, data for the IOCB of block B204 is received by adapter 116 and placed at one of the transmit buffers 164A-164N. Logic 162 provides a slot number for the transmit buffer to the scheduler 160 based on the DMA request order information in the data structure. If data for a later request is available before the data for an earlier request, then the slot number for the data for the later request is not provided to the scheduler until the data for the earlier request is available. The scheduler 160 upon receiving the slot number information queues the request for transmission and schedules delivery of data via the network link 132.

The embodiments disclosed herein have advantages, for example, hardware resources (i.e. DMA channels) are used in an optimum manner based on the number of I/O requests that have to be processed at any given time. Because more than one DMA channel is used for moving information, the overall throughput or rate at which data is transferred from adapter 116 increases.

The above description presents the best mode contemplated for carrying out the present embodiments, and of the manner and process of making and using them, in such full, clear, concise, and exact terms as to enable any person skilled in the art to which they pertain to make and use these embodiments. These embodiments are, however, susceptible to modifications and alternate constructions from that discussed above that are fully equivalent. For example, the embodiments disclosed herein are applicable to any peripheral device and are not limited to any particular adapter type. Consequently, these embodiments are not limited to the particular embodiments disclosed. On the contrary, these embodiments cover all modifications and alternate constructions coming within the spirit and scope of the embodiments as generally expressed by the following claims, which particularly point out and distinctly claim the subject matter of the embodiments.

What is claimed is:

1. A machine implemented method for sending data from a memory of a computing system interfacing with a device, comprising:
   receiving an input/output control block (IOCB) from the computing system for transferring the data from the memory of the computing system to the device;
   allocating a plurality of DMA channels to the IOCB for transferring the data from the memory of the computing system when a number of pending input/output (I/O) requests when the IOCB is received is less than a number of available direct memory access (DMA) channels to receive the data from the memory of the computing system;
   receiving portions of the data from the memory of the computing system and saving the portions of data at one or more memory storage locations at the device;
   tracking an order in which the portions of data for the IOCB are received compared to any other pending request; and
   transmitting the data to another device via a link.

2. The method of claim 1, wherein the device is a PCI-Express device.

3. The method of claim 1, wherein the device is a host bus adapter coupled to the computing system using a PCI-Express link.

4. The method of claim 1, wherein the device is a converged network adapter coupled to the computing system using a PCI-Express link.

5. The method of claim 1, wherein the device is an adapter coupled to the computing system using a PCI-Express link.

6. The method of claim 1, wherein a transmit scheduler controls an order in which data is read from one or more memory storage locations of the device.

7. The method of claim 1, wherein when the number of input/output (I/O) requests is greater than the number of available direct memory access (DMA) channels, then using a dedicated DMA channel for each I/O request for transferring any data from the memory of the computing system.

8. The method of claim 1, wherein the IOCB includes an address of the memory at the computing system where the data is stored prior to the transfer and a length indicating an amount of data stored at the memory of the computing system.

9. A system, comprising:
a computing system having a memory and a processor; and
a device interfacing with the computing system for receiving data from the memory of the computing system to a memory device of the device;
wherein the device is configured to receive an input/output control block (IOCB) from the computing system for transferring the data from the memory of the computing system to the device; allocates a plurality of DMA channels to the IOCB for transferring the data from the memory of the computing system, when a number of pending input/output (I/O) requests when the IOCB is received is less than a number of available direct memory access (DMA) channels to receive the data from the memory of the computing system; receives portions of the data from the memory of the computing system and saves the portions of data at one or more memory storage locations at the device; tracks an order in which the portions of data are received for the IOCB compared to any other pending request; and transmits the data to another device via a link.

10. The system of claim 9, wherein the device is a PCI-Express device.

11. The system of claim 9, wherein the device is a host bus adapter coupled to the computing system using a PCI-Express link.

12. The system of claim 9, wherein the device is a converged network adapter coupled to the computing system using a PCI-Express link.

13. The system of claim 9, wherein the device is an adapter coupled to the computing system using a PCI-Express link.

14. The system of claim 9, wherein a transmit scheduler controls an order in which data is read from one or more memory storage locations of the device.

15. The system of claim 9, wherein when the number of input/output (I/O) requests is greater than the number of available direct memory access (DMA) channels, then using a dedicated DMA channel for each I/O request for transferring data from the memory of the computing system.

16. The system of claim 9, wherein the IOCB includes an address of the memory at the computing system where the data is stored prior to the transfer and a length indicating an amount of data stored at the memory of the computing system.

17. A device, comprising:
an interface for communicating with a computing system having a memory and a processor;
a plurality of direct memory access (DMA) channels managed by a DMA module for transferring data from the memory of the computing system; and
a memory device for receiving data from the memory of the computing system;
wherein the device is configured to receive an input/output control block (IOCB) from the computing system for transferring the data from the memory of the computing system to the device; allocates more than one DMA channel to the IOCB for transferring the data from the memory of the computing system, when a number of pending input/output (I/O) requests when the IOCB is received is less than a number of available DMA channels to receive the data from the memory of the computing system; receives portions of the data from the memory of the computing system and saves the portions of data at one or more memory storage locations at the device; tracks an order in which the portions of data for the IOCB are received compared to any other pending request; and transmits the data to another device via a link.

18. The device of claim 17, wherein the device is a PCI-Express device.

19. The device of claim 17, wherein the device is a host bus adapter or a converged network adapter coupled to the computing system using a PCI-Express link.

20. The device of claim 17, wherein when the number of input/output (I/O) requests is greater than the number of available direct memory access (DMA) channels, then using a dedicated DMA channel for each I/O request for transferring any data from the memory of the computing system.

* * * * *